United States Patent
Popov et al.

(10) Patent No.: US 10,266,914 B2
(45) Date of Patent: Apr. 23, 2019

(54) DEVICE AND METHOD FOR RECOVERING A NON-FERROUS METAL FROM HOT DROSS

(71) Applicant: LIGHT METALS LTD., Krasnoyarsk (RU)

(72) Inventors: Yury Nikolaevich Popov, Krasnoyarsk (RU); Peter Vasilievich Polyakov, Krasnoyarsk (RU); Olga Nikolaevna Popova, Krasnoyarsk (RU)

(73) Assignee: LIGHT METALS LTD., Krasnoyarsk (RU)

(*) Notice: Subject to any disclaimer, the term of this patent is extended or adjusted under 35 U.S.C. 154(b) by 181 days.

(21) Appl. No.: 15/324,508

(22) PCT Filed: Jun. 24, 2015

(86) PCT No.: PCT/RU2015/000387
§ 371 (c)(1),
(2) Date: May 3, 2017

(87) PCT Pub. No.: WO2016/003321
PCT Pub. Date: Jan. 7, 2016

(65) Prior Publication Data
US 2017/0226610 A1    Aug. 10, 2017

(30) Foreign Application Priority Data
Jul. 4, 2014    (RU) .................. 2014127430

(51) Int. Cl.
| C22B 7/04 | (2006.01) |
| C22B 7/00 | (2006.01) |
| C22B 19/30 | (2006.01) |
| C22B 21/00 | (2006.01) |
| C22B 26/22 | (2006.01) |

(52) U.S. Cl.
CPC ................ *C22B 7/04* (2013.01); *C22B 7/005* (2013.01); *C22B 19/30* (2013.01);
(Continued)

(58) Field of Classification Search
CPC .................. C22B 7/04; C22B 7/005
(Continued)

(56) References Cited

U.S. PATENT DOCUMENTS

| 201,817 A | 10/1878 | Rees |
| 563,769 A | 7/1896 | Howard |

(Continued)

FOREIGN PATENT DOCUMENTS

| RU | 2159295 C1 | 11/2000 |
| RU | 2494157 | 9/2013 |
| RU | 2494157 C1 | 9/2013 |

*Primary Examiner* — Scott R Kastler
(74) *Attorney, Agent, or Firm* — John Alumit

(57) ABSTRACT

An apparatus for recovery of non-ferrous metal from hot dross having a frame with a dross compression head; a sow mold for collecting metal compressed from the dross; a skim pan mounted on said sow mold; at least one through opening with a connection means for supplying a vacuum, said opening being situated in the bottom part of the skim pan and/or in the sow mold; and a seal, situated in the gap between the skim pan and the sow mold; furthermore, one or several through drainage openings are provided in the bottom part of the skim pan.

10 Claims, 5 Drawing Sheets

(52) U.S. Cl.
CPC .......... *C22B 21/0069* (2013.01); *C22B 26/22* (2013.01); *Y02P 10/212* (2015.11)

(58) Field of Classification Search
USPC .................................................. 266/227, 232
See application file for complete search history.

(56) References Cited

U.S. PATENT DOCUMENTS

| | | |
|---|---|---|
| 2,278,135 A | 8/1942 | Osborn |
| 3,198,505 A | 8/1965 | Amdur et al. |
| 3,517,918 A | 6/1970 | Cenkner |
| 3,999,980 A | 12/1976 | Montagna |
| 4,003,559 A | 1/1977 | Kuwano et al. |
| 4,057,232 A | 11/1977 | Ross et al. |
| 4,386,956 A | 6/1983 | Roth |
| 4,527,779 A | 7/1985 | Roth |
| 4,565,572 A | 1/1986 | van Linden et al. |
| 4,575,056 A | 3/1986 | Jilliard et al. |
| 4,637,591 A | 1/1987 | McMahon et al. |
| 4,772,320 A | 9/1988 | van Linden et al. |
| 5,397,104 A | 3/1995 | Roth |
| 5,669,657 A | 9/1997 | Roth |
| 5,788,918 A | 8/1998 | Bramley |
| 5,882,580 A | 3/1999 | Pownall |
| 5,906,790 A | 5/1999 | Bramley |
| 5,980,817 A | 11/1999 | Pawnall |
| 6,063,330 A | 5/2000 | Bramley |
| 6,228,319 B1 | 5/2001 | Roth et al. |
| 2017/0226610 A1 * | 8/2017 | Popov ........................ C22B 7/04 |

* cited by examiner

DEVICE AND METHOD FOR RECOVERING A NON-FERROUS METAL FROM HOT DROSS

FIELD OF THE INVENTION

The invention relates to recycling of non-ferrous metals, preferably of aluminum, alloys thereof, magnesium, zinc from hot dross removed from melting furnaces, mixers and other thermal apparatuses.

BACKGROUND OF THE INVENTION

Apparatuses for compression of hot dross of non-ferrous metal, preferably aluminum, alloys thereof, magnesium, zinc dross, comprising dross compressing head with ribbed or non-ribbed surfaces and skim pan with or without ribbed surfaces, as well as having one or more through drainage holes in bottom are known in the prior art.

Known is an apparatus for compression of hot dross of non-ferrous metal, preferably aluminum, alloys thereof, magnesium, zinc dross, comprising frame with dross compressing externally ribbed head of semispherical or elongated semispherical shape; skim pan with one or more through drainage holes in bottom, wherein the skim pan is located on the top of sow mould, which collects drained from dross metal. (U.S. Pat. No. 5,397,104, March 1995. Roth D.).

Known is the method (U.S. Pat. No. 4,386,956, June 1983, Roth D.) for recovery of free aluminum metal from a metal bearing dross containing free aluminum metal and oxides of said metal, said method comprising the steps of:
(a) collecting the dross in a skim pan having at least one trough with at least one downwardly and inwardly inclined side wall with metal flow passages through the wall;
(b) collecting the free aluminum metal which decants through the passages;
(c) mechanically compacting the dross by applying a compressive force on the dross and against the inclined wall above a threshold pressure to pool free aluminum metal within a dross, effect migration of the free aluminum metal toward a boundary surface of the compacted dross, decant a portion of said free aluminium through the passage and inhibiting the oxygen supply to the free aluminum metal in the dross; and
(d) cooling the compacted dross and free aluminum metal to solidify the free aluminum metal; such that thermite reaction of free aluminum metal and oxygen in the dross is diminished by the combination of compacting above the threshold pressure and cooling of the metal.

Known is the method (U.S. Pat. No. 4,565,572, January 1986 van Linden at al.) for the recovery of free aluminum metal from hot aluminum dross which forms on the surface of molten aluminum during aluminum melting operations, said dross containing free aluminum metal and a solids network, said method comprising the steps of:
(a) charging the hot dross from the aluminum melting operation into a receptacle having at least one inclined sidewall and at least one passageway;
(b) mechanically compacting the dross with a heated ram, said compacting applying a compressive force on the dross towards the inclined sidewall such that a substantial portion of the free aluminum separates from the dross and passes through the bottom passageway;
(c) maintaining the temperature of the hot dross during its collection in the receptacle and subsequent mechanical compaction so as to enhance the removal of free aluminum therefrom; and
(d) collecting the free aluminum metal which passes through the bottom passageway.

A drawback of the aforementioned method is that due to the preliminary heating of the head, and other conditions being equal, the dross cooling cycle time increases, and hence, as a result of longer oxidation time of aluminum, the metal recovery decreases.

A drawback of the aforementioned methods and apparatus is that the amount of metal, drained from hot dross, the so called in-house metal recovery, is usually relatively lower (from 3 to 20%), than the metal content remaining in dross skull after freezing (from 40 to 70%). Further secondary recovery of metal from frozen dross is as a rule accompanied with its supplemental mechanical and/or thermal treatment (melting), which results in additional metal loss.

Known is the prototype for recovery of non-ferrous metal from hot dross, comprising a frame with dross compressing head, a sow mould for collection of drained metal from dross and a skim pan, provided with one or more through drainage holes in a bottom part on said sow mould, characterized in that provided with at least one through hole with connection for switching on vacuum through said sow mould wall, sealing located in the gap between said skim pan and sow mould.

A drawback of the aforementioned prototype is that the location of the through hole with a connection for switching on a vacuum through said sow mould wall, in the case of hot dross with a high aluminium content (more than 55%), results in an overlapping/blocking of the aforementioned hole by drained metal in the sow mould when completely full. It does not allow more metal to drain into the sow mould.

SUMMARY OF INVENTION AND OBJECTS

This invention is aimed at increase in recovery of non-ferrous metal from dross.

Technical results are achieved in the apparatus for recovery of non-ferrous metal from hot dross, preferably aluminium, alloys thereof, magnesium, zinc from hot dross removed from melting furnaces, mixers and other thermal apparatuses, comprising a frame with dross compressing head, a sow mould for collection of drained metal from dross and a skim pan mounted on said sow mould, characterized in that the skim pan is provided with one or more through holes with connection for switching on a vacuum through a bottom part of said skim pan, and a sealing located in the gap between said skim pan and said sow mould, wherein said skim pan is provided with one or more through drainage holes in a bottom wall. The location of through holes with connection for switching on a vacuum through said skim pan bottom wall is preferable, than in the sow mould wall. The reason is that the through hole with connection for switching on a vacuum through said skim pan bottom wall is always located higher than in the sow mould. Consequently, there is less probability for said through hole to be overlapped/blocked by drained metal in the event the sow mould is completely full. It allows more metal to drain in the sow mould.

The apparatus can comprise sealing between the dross compressing head and said skim pan.

The head can be ribbed. The skim pan can be ribbed.

The head can be made hollow with at least two manifolds with air cooling.

The apparatus can comprise a hermetically sealed cover, hermetically mounted on a rod of a hydraulic cylinder capable of sliding along the rod and hermetically conforming to edges of the skim pan.

The apparatus can comprise a hermetically sealed cover, hermetically mounted on the rod of hydraulic cylinder with capable of sliding along the rod and hermetically conforming to the edges of the skim pan by means of pneumatic or/and hydraulic cylinders (from 1 to 4 pcs), or/and electric drive.

The apparatus can comprise hermetic cover, hermetically female the rod of hydraulic cylinder with a possibility of sliding along the rod and hermetically to cover the skim pan by means of pneumatic or/and hydraulic cylinders (from 1 to 4 pcs), or/and electric drive and, at least one or more through hole in said cover provided a connection for inert gas supply.

The apparatus can comprise one or more vibrators of said skim pan and/or said head.

The apparatus can comprise one or more magneto-hydrodynamic (MHD) pumps for moving of metal to one or more drainage holes in the bottom of said skim pan.

A vacuum promotes recovery of liquid metal from pores of hot dross and drainage via through holes in the bottom of said skim pan, that is, the vacuum increases recovery of metal from dross. The vacuum also promotes flow of liquid metal in the layer adjacent to the bottom of the skim pan, accelerates heat and mass transfer, cooling of metal in the dross, decreases metal oxidation, and increases metal recovery from dross.

A semispherical or elongated semispherical press head is integrated with said skim pan, wherein dross compression external layers of metal are formed within, which are crystallized mainly near surfaces of said head and said skim pan, along with an internal layer of metal oxide, which is encapsulated between the metal layers.

A hot dross compressing head draws off thermal energy from the dross through thermal conductivity and thermal capacity, decreases access of air oxygen to hot metal in the dross, and decreases its oxidation and possible thermite reactions.

Ribbing of the press head increases the surface area of contact with the dross, and increases energy heat transfer from the dross to said head, thus facilitating an early cooling of the dross and decreasing in metal oxidation in the dross.

Ribbing of the press head creates high specific pressure on the dross and grooving of the dross, thereby facilitating breakage and subsequent supplemental recovery of metal from frozen pressed dross (skull).

There is a frame with a dross compressing head provided with a power drive, particularly, a hydraulic cylinder with a rod.

In regards to compression of hot dross, as a rule with higher metal content in excess of 50%, fine metal particles coagulate and coalesce into coarser particles, and external dross surfaces are metalized and compressed. Herewith, natural sealing of the gap between said compressing head and skim pan occurs, and a vacuum via through hole in said skim pan and drainage hole in the bottom of skim pan is formed, provided that there exists a sealing between said sow mould and said skim pan. This increases drainage of liquid metal from hot dross. However, in the case of low metal content in the dross, below 50%, metallization and compressing of the external surfaces of the dross can be inefficient. In such a case, additional sealing is applied between the dross compressing head and the skim pan.

In particular, if additional sealing is needed, the apparatus can comprise an additional hermetically sealed cover, hermetically mounted on a rod of a hydraulic cylinder capable of sliding along the rod and hermetically conforming to edges the skim pan.

With the goal of reducing the additional cover movement time, the apparatus can comprise an additional hermetically sealed cover, hermetically mounted on the rod of a hydraulic cylinder and capable of sliding along the rod and hermetically conforming to edges of the skim pan by means of pneumatic or/and hydraulic cylinders (from 1 to 4 pcs), or/and electric drive.

For additional insulation from air oxygen and pressure increase from the head side, the apparatus can comprise an additional hermetically sealed cover, hermetically mounted on the rod of a hydraulic cylinder and capable of sliding along the rod and hermetically conforming to edges of the skim pan with at least one through hole in said cover provided with a connection for inert gas supply.

The apparatus can comprise one or more vibrators of said skim pan and/or said head, further comprising one or more magneto-hydrodynamic (MHD) pumps facilitating movement of metal to one or more drainage holes in the bottom of said skim pan.

The head can be hollow with air cooling, which reduces dross cooling time and decreases metal oxidation loss. The walls of said sow mould are preferably made of alloyed steel or cast iron.

BRIEF DESCRIPTION OF THE DRAWINGS

The brief description of the invention is explained referring to the drawings below.

DESCRIPTION OF REFERRED EMBODIMENT

Figure 1:
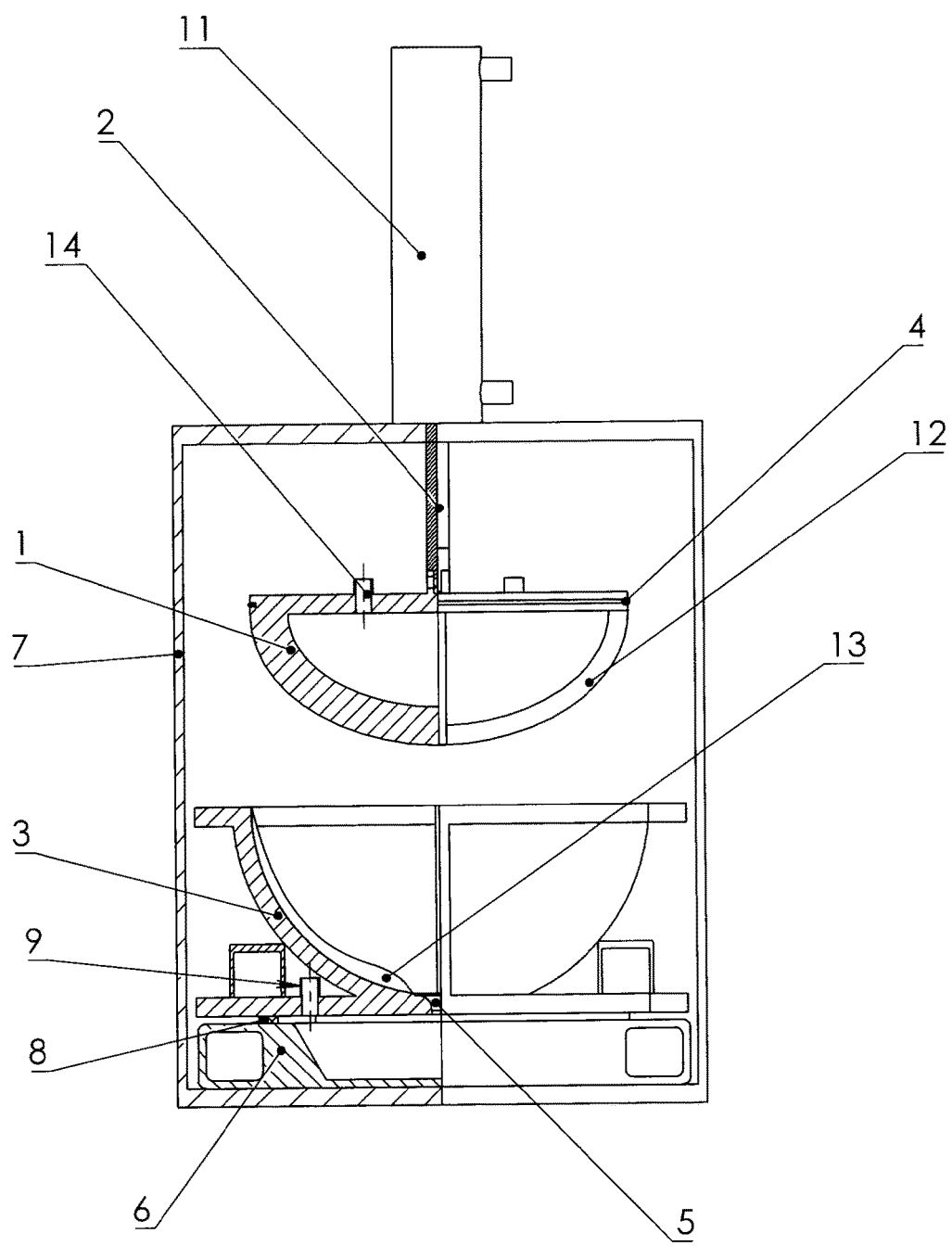
FIGS. 1 and 2. General front side view of the apparatus for recovery of non-ferrous metal from hot dross provided with through hole in the skim pan bottom with connection for switching on vacuum "manually" just after the positioning of the skim pan inside of said apparatus by means of a forklift.

The apparatus comprises the head 1 with rod 2 for compression of hot dross, skimmed from melt surface in furnace/mixer and loaded into skim pan 3, provided with sealing 4 between head 1 and skim pan 3. Skim pan 3 provided with one or more through holes 5 in bottom for drainage of drained metal into lower sow mould 6. Drained metal is collected in the sow mould 6. There is sealing 8 between skim pan 3 and sow mould 6, and at least one through hole 9 with a connection for switching on vacuum through said skim pan bottom. There is a frame 7 with a dross compressing head 1 provided with a power drive 11, particularly, hydraulic cylinder with a rod 2.

The head 1 either does not have or has ribbing 12. Skim pan 3 either does not have or has ribbing 13. The dross compressing head 1 could be made hollow with at least two manifolds 14 with air cooling.

Figure 2:
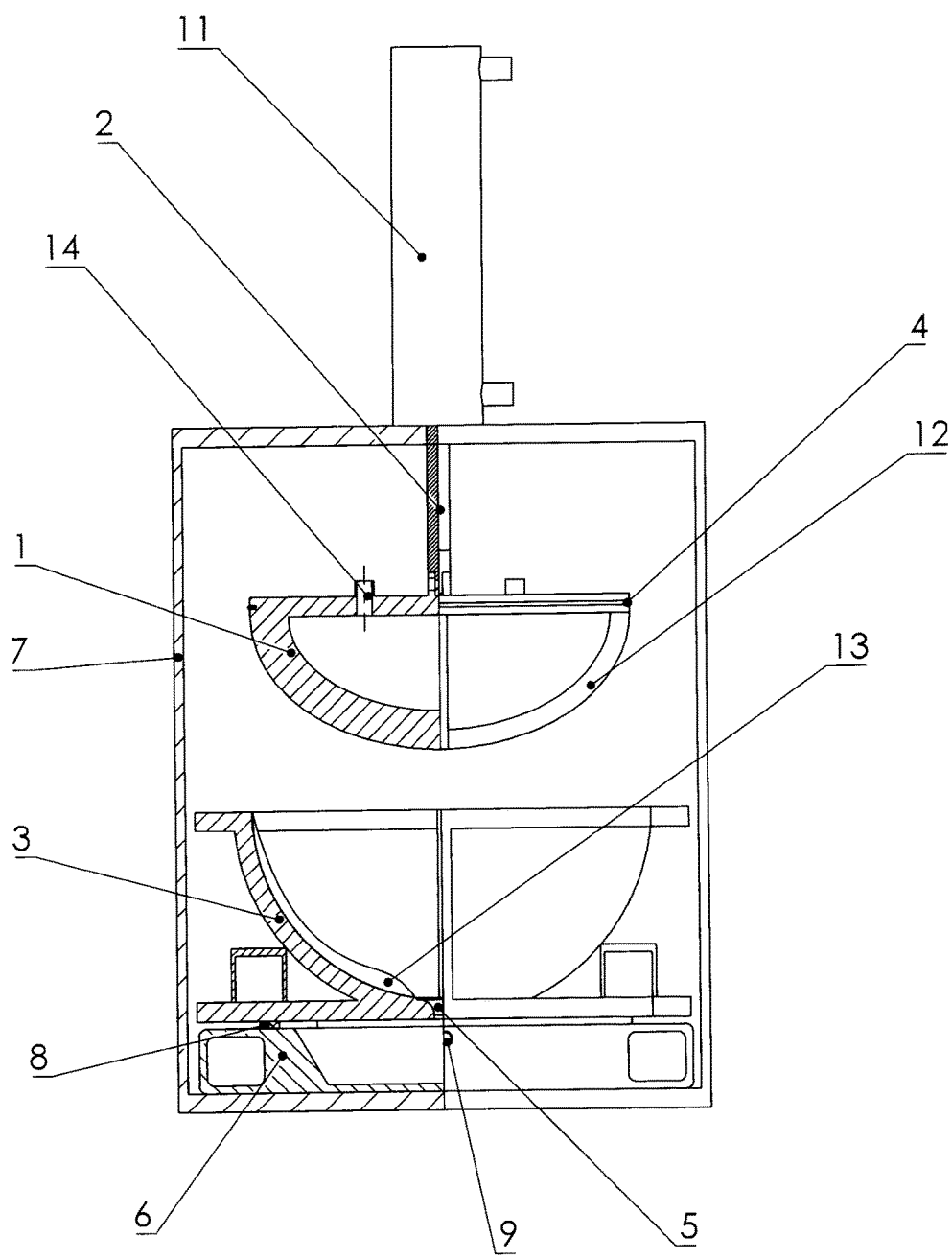

One or more vibrators of said skim pan and/or said head, further comprising one or more magneto-hydrodynamic (MHD) pumps 15 [FIG. 2] facilitate for moving of metal to one or more drainage holes 5 in the bottom of said skim pan 3.

In the case of low metal content in dross, below 50%, metallization and compressing of external surfaces of dross can be inefficient. In such case additional sealing 4 is applied between the dross compressing head 1 and skim pan 3.

Figure 3:
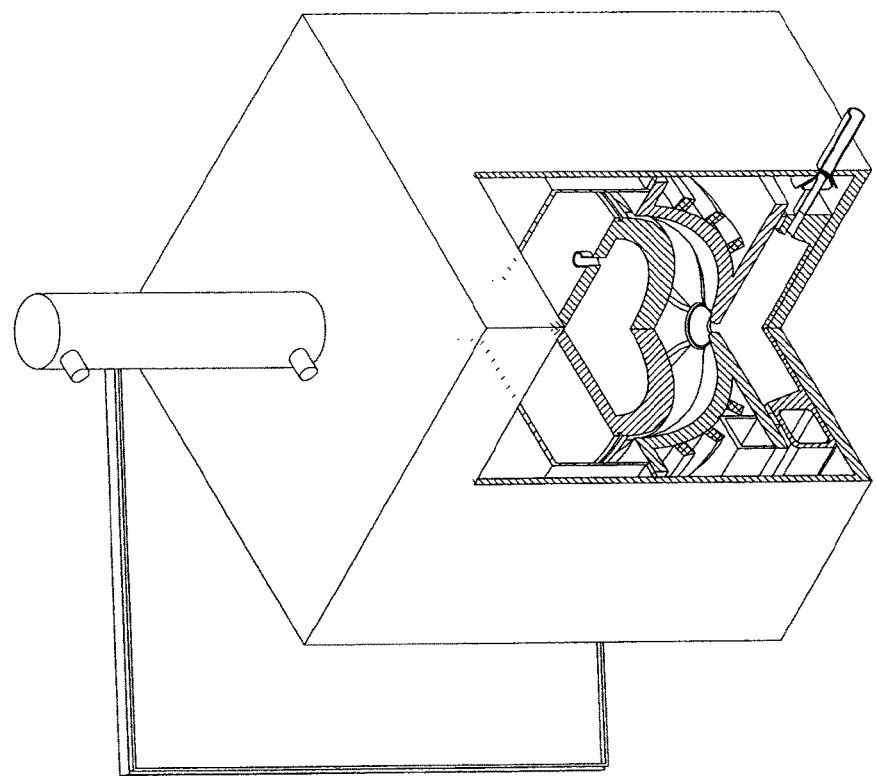
FIGS. 3 and 4. Back side view with a partial section of the apparatus for recovery of non-ferrous metal from hot dross provided with through hole in the skim pan bottom with connection for switching on vacuum, providing an automatic coupling of said skim pan with vacuum source (piping to vacuum pump) at the moment of positioning of the skim pan inside of said apparatus by means of a forklift.
Figure 3:
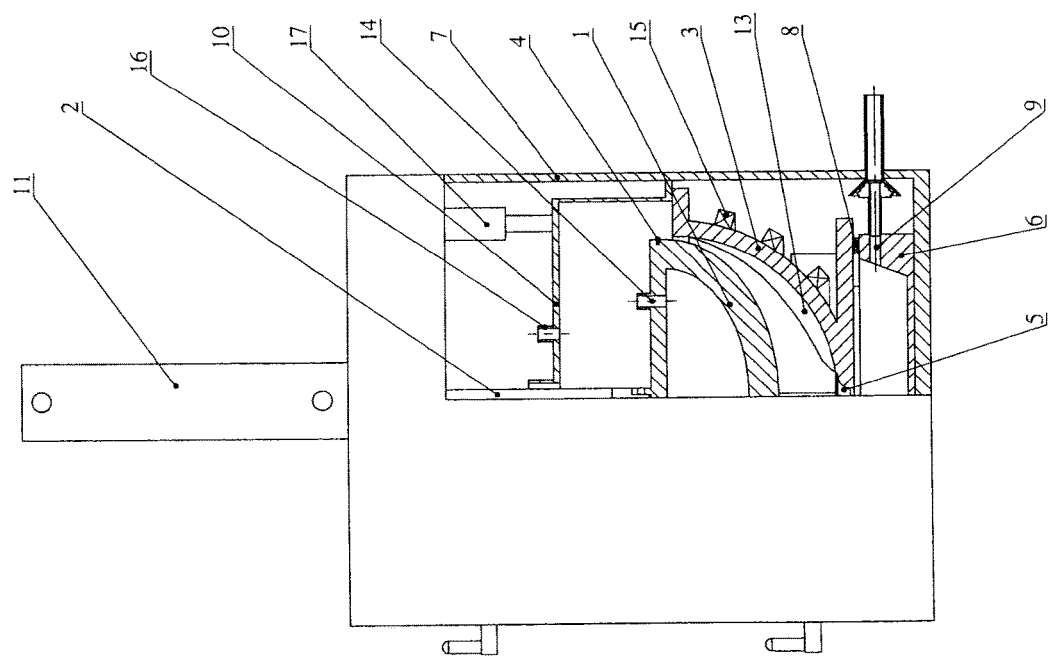
Figure 4:
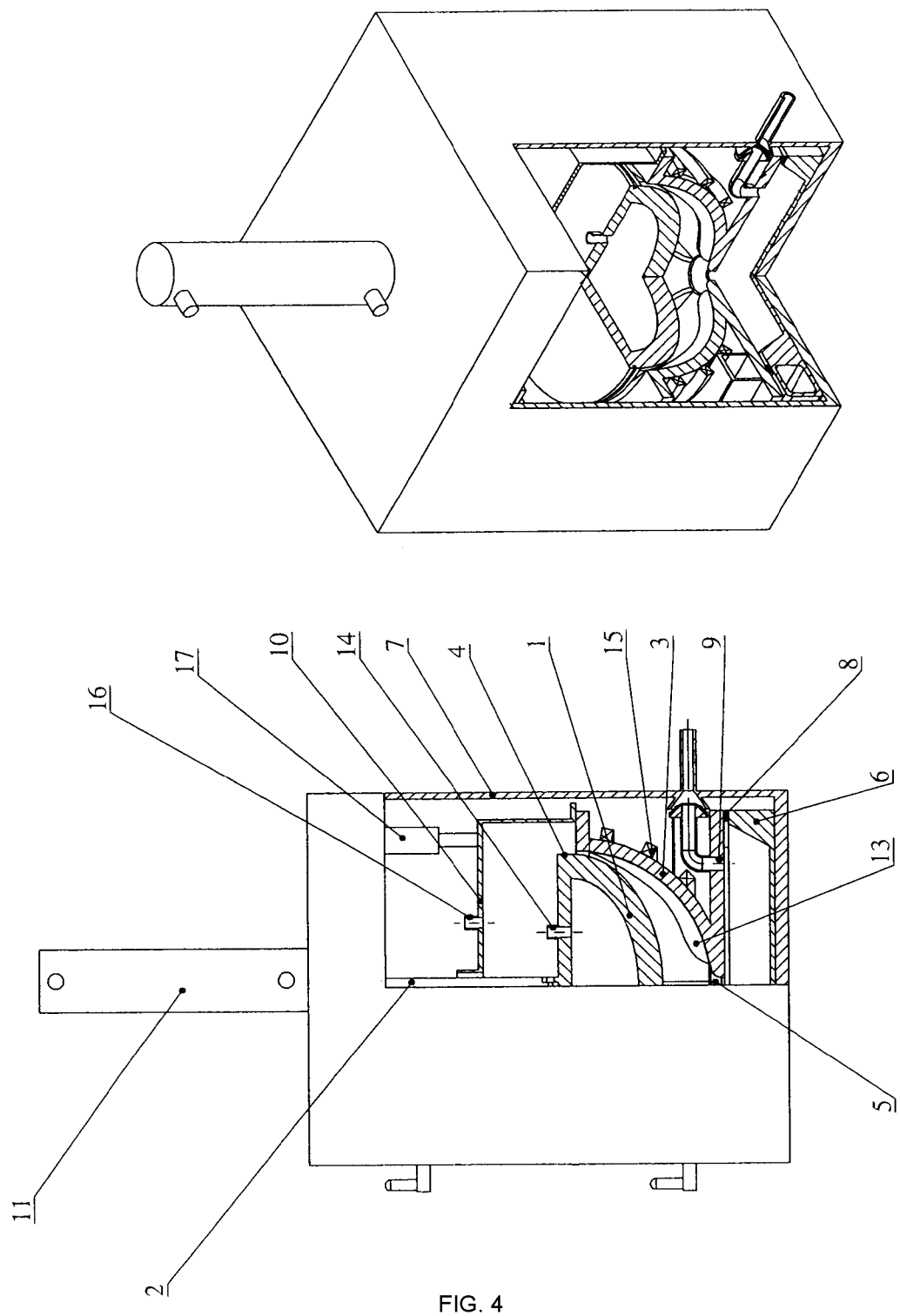
Figure 5:
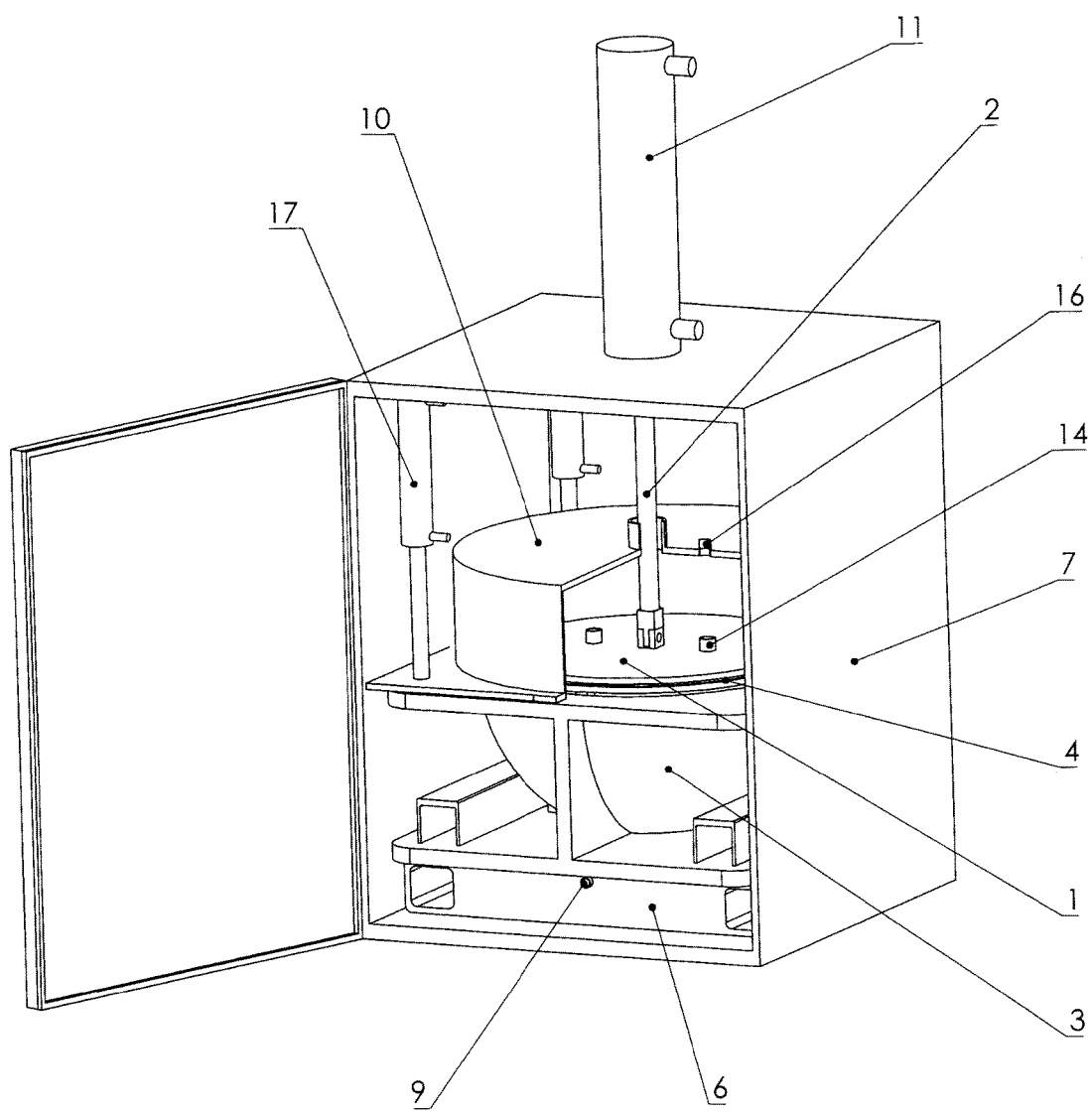
FIG. 5. General view with a partial section of the apparatus for recovery of non-ferrous metal from hot dross provided with an additional hermetically sealed cover, hermetically mounted on the rod of a hydraulic cylinder and capable of sliding along the rod and hermetically conforming to the edges of the skim pan by means of pneumatic or/and hydraulic cylinders (from 1 to 4 units), or/and electric drive.

Particularly, in case of additional sealing necessity, the apparatus can comprise an additional hermetically sealed cover 10 [FIG. 2-3], hermetically mounted to the rod 2 of hydraulic cylinder 11 and capable of sliding along the rod 2 and hermetically conforming to edges of the skim pan 3.

To reduce the additional cover movement time, the apparatus can comprise an additional hermetically sealed cover 10, hermetically mounted to the rod 2 of hydraulic cylinder 11 and capable of sliding along the rod 2 and hermetically conforming to edges of the skim pan 3 by means of pneumatic or/and hydraulic cylinders 17 (from 1 to 4 pcs), or/and electric drive [FIG. 2-3].

For additional insulation from air oxygen and pressure increase from the head side, the apparatus can comprise an additional hermetically sealed cover 10, hermetically mounted on the rod 2 of hydraulic cylinder 11 and capable of sliding along the rod 2 and hermetically conforming to edges of the skim pan 3 by means of pneumatic or/and hydraulic cylinders 17 (from 1 to 4 pcs), or/and electric drive and, at least one or more through holes 16 in said cover providing a connection for inert gas supply.

The apparatus operation is as following:
The skim pan 3 is put on the sow mould 6 by means of a forklift. Hot dross is to be skimmed from the melting/holding furnace melt surface into the skim pan 3 which is disposed on the sow mould 6. Said skim pan 3 is placed on the sow mould 6 by means of a forklift into the apparatus for hot dross compression (press). Said seal 8 is provided between said skim pan 3 and sow mould 6, along with one or more through holes 9 with connection for switching on vacuum through said skim pan 3 bottom. The head 1 with rod 2 compress the hot dross, and the head 1 can be made hollow with at least two manifolds 14 to be cooled with air.

The sealing 4 between said head 1 and skim pan 3 promotes vacuumization.

In case of additional sealing necessity, the apparatus can comprise an additional hermetically sealed cover 10 [FIG. 2-3], hermetically mounted on the rod 2 of hydraulic cylinder 11 and capable of sliding along the rod 2 and hermetically conforming to the edges of the skim pan 3.

To reduce the additional cover 10 movement time, the apparatus can comprise an additional hermetically sealed cover 10, hermetically mounted on the rod 2 of hydraulic cylinder 11 and capable of sliding along the rod 2 and hermetically conforming to edges of the skim pan 3 by means of pneumatic or/and hydraulic cylinders 17 (from 1 to 4 pcs) [FIG. 2-3], or/and electric drive [FIG. 2-3].

The drained metal is to be collected in said sow mould 6.

In comparison with the prototype, other conditions being equal, vacuum and/or vibrator of head and/or skim pan, and/or MHD pumps facilitate an increase in metal recovery from dross.

The invention claimed is:

1. An apparatus for recovery of non-ferrous metal from hot dross, comprising a frame, inside of which are a dross compressing head, and below said dross compressing head is a skim pan provided with at least one through drainage hole disposed on a bottom part of said skim pan, a sow mould disposed below said skim pan for collection of drained metal from hot dross, and a seal disposed in a gap between said skim pan and said sow mould, wherein said at least one through drainage hole is provided with a connection for switching on a vacuum through said bottom part.

2. The apparatus of claim 1, further comprising a seal between said dross compressing head and said skim pan.

3. The apparatus of claim 1, further comprising a hermetic cover, hermetically mounted on a rod of a hydraulic cylinder and capable of sliding along the rod and hermetically conforming to edges of the skim pan.

4. The apparatus of claim 3, wherein sliding along the rod is assisted by 1 to 4 pneumatic or/and hydraulic cylinders and/or electric drives.

5. The apparatus of claim 4, further comprising at least one or more through holes in said cover providing a connection for inert gas supply.

6. The apparatus of claim 1, further comprising one or more vibrators of said skim pan and/or said head.

7. The apparatus of claim 1, further comprising one or more magneto-hydrodynamic pumps for moving of metal to one or more drainage holes in the bottom part of said skim pan.

8. The apparatus of claim 1, wherein said head is made hollow with at least two manifolds with air cooling.

9. The apparatus of claim 1, wherein the head is ribbed.

10. The apparatus of claim 1, wherein the skim pan is ribbed.

* * * * *